US012558914B2

(12) United States Patent
Fields et al.

(10) Patent No.: US 12,558,914 B2
(45) Date of Patent: Feb. 24, 2026

(54) SYSTEM AND METHOD FOR PRINTING ON A TREATED SURFACE

(71) Applicant: JUNO DTS, LLC, Cincinnati, OH (US)

(72) Inventors: Nicholas Fields, Hamilton, OH (US); Mike Luttrell, Dayton, OH (US); Dirk Lavoy, Kettering, OH (US); Robert Wilson, Boone, NC (US); Nicholas Diblasi, Montgomery, OH (US)

(73) Assignee: JUNO DTS, LLC, Cincinnati, OH (US)

( * ) Notice: Subject to any disclaimer, the term of this patent is extended or adjusted under 35 U.S.C. 154(b) by 0 days.

(21) Appl. No.: 17/865,627

(22) Filed: Jul. 15, 2022

(65) Prior Publication Data

US 2022/0355605 A1 Nov. 10, 2022

Related U.S. Application Data

(63) Continuation of application No. 17/050,524, filed as application No. PCT/US2019/029695 on Apr. 29, 2019, now Pat. No. 11,390,104.

(60) Provisional application No. 62/663,397, filed on Apr. 27, 2018.

(51) Int. Cl.

*B41M 5/00* (2006.01)
*B41M 1/40* (2006.01)
*B41M 7/00* (2006.01)
*B41M 7/02* (2006.01)

(52) U.S. Cl.

CPC ............ *B41M 7/0045* (2013.01); *B41M 1/40* (2013.01); *B41M 5/0011* (2013.01); *B41M 5/0082* (2013.01); *B41M 5/0088* (2013.01); *B41M 7/0054* (2013.01); *B41M 7/02* (2013.01)

(58) Field of Classification Search

CPC .... B41M 7/0045; B41M 1/40; B41M 5/0011; B41M 5/0082; B41M 5/0088; B41M 7/0054; B41M 7/02

See application file for complete search history.

(56) References Cited

U.S. PATENT DOCUMENTS

2013/0101809 A1* 4/2013 Kohlweyer .......... B41M 7/0018 427/487
2013/0316091 A1* 11/2013 Wittmann ................ B05D 5/00 427/552

FOREIGN PATENT DOCUMENTS

CN 106079791 B * 6/2019 ........... B32B 15/088
JP 2013203429 A * 10/2013 ............... B65D 8/00

* cited by examiner

*Primary Examiner* — Yaovi M Ameh

(74) *Attorney, Agent, or Firm* — Taft Stettinius & Hollister LLP; Derek B. Lavender

(57) ABSTRACT

A method for safely differentiating a three dimensional object subsequent to its creation and varnish protection by means of applying and sealing a decoration and/or data between the original and a final varnish layers. The three dimensional object may be decorated and/or contain data from its original manufacturing process but it may also be protected by a varnish prior to utilizing this process. The method enables the addition of decoration and data at any time or location subsequent to the original manufacturing process. The process takes place on top of the original varnish and may be subsequently sealed by applying another varnish layer.

19 Claims, 2 Drawing Sheets

SYSTEM AND METHOD FOR PRINTING ON A TREATED SURFACE

CROSS-REFERENCE TO RELATED DISCLOSURES

The present disclosure is a continuation of U.S. application Ser. No. 17/050,524 filed on Oct. 26, 2020 which is a National Stage Entry of International Application No. PCT/US2019/029695 filed on Apr. 29, 2019 which claims priority from U.S. Provisional Application No. 62/663,397 filed on Apr. 27, 2018, the disclosure of which are hereby incorporated herein in entirety.

FIELD OF THE DISCLOSURE

The present disclosure relates to printing onto a surface, and more specifically to printing onto a surface that has been previously treated with a varnish.

BACKGROUND

The labelling and advertising on consumer goods is a crucial component to many products. Often, products are provided to a consumer in a predesigned package or object that contains the product desired by the consumer within. The package is manufactured at a location separate from the product and often shipped to a different location to be filled with the product. Accordingly, the package is often coated with a material or substance to ensure that the package does not corrode or become damaged before the product is added therein.

One example of a typical printed object is illustrated in FIG. 1. The object of FIG. 1 may have an image 11 thereon. In this example, the image 11 is created on a raw material 12 that has a primer 13 thereon. The primer 13 allows a base color layer 14 to adhere thereto before a second color layer 15 is applied. Lastly, a coating 16 such as a varnish is applied.

FIG. 2 illustrates another example of a typical printed object. FIG. 2 shows an image 1 on a raw material 2. A primer 3 is applied to the surface of the raw material 2 and a base color layer 4 and color layer 5 are subsequently applied thereon. Then, a final coating 6 such as a varnish is applied.

Often, during the initial manufacturing process of the package, many three dimensional objects are coated with an external varnish (clear coat, protective coating, top coat, etc.). This varnish is often very robust and is typically designed to be the final and complete protection for the package. As such the varnish creates a tremendous barrier layer for the raw material of the package and any product contained within it.

The package is often decorated directly at the manufacturing site via a known printing process such as Offset, Flexo, Gravure, Digital and the like. This typical manufacturing process often requires a planned setup, a high volume, and long lead times. The typical manufacturing process eliminates the ability to utilize any package produced therefrom in a mass customization business model. Those that would prefer a lean supply chain and object flexibility by adding decoration later in the process have very limited available options. Most of these options require the addition of another substrate to the object later in the process. A few current methods of downstream decoration addition include mechanically applied art work like stickers, labels, shrink sleeves, and the like. These technologies often leave much to be desired from the perspective of object quality, cost, and recyclability.

A further challenge in delayed differentiation of an object is the addition of data. There are many types of data standards available. A few examples include UPC/GTIN, date/timestamp, 2d/3d data matrix, digital identifiers, variable data and the like. Typical data addition is often completed today via etching, dot matrix, laser, or other similar application method. Effective and accurate data representation is often very important for the manufacturer. Often, ineffective application of data may result in the object manufacturer being fined among other things.

SUMMARY

One embodiment is a method for applying an ink to an object, the method includes providing a raw material that has a varnish layer thereon, executing an enhancement to the varnish layer so the varnish receives an ink, and applying a secondary ink to the varnish layer wherein the varnish layer is at least partially positioned between the secondary ink and the raw material.

One example of this embodiment includes applying a final varnish layer over the secondary ink wherein the secondary ink is positioned between the varnish layer and the final varnish layer. In another example, the object has a primary ink layer between the raw material and the varnish layer. In one aspect of this example, the object has a treatment layer between the raw material and the primary ink.

In yet another example of this embodiment, the varnish layer and the secondary ink are not applied in the same manufacturing facility. In another example, the object has a primary ink layer between the raw material and the varnish layer and a final varnish layer over the secondary ink wherein the secondary ink is layered between the varnish layer and the final varnish layer.

In yet another example, the object has an outer surface and the secondary ink does not cover the entire outer surface and the final varnish only covers the portions of the outer surface that have secondary ink thereon.

In yet another example, the raw material is a can and the secondary ink is applied after a necking process. In one example the varnish layer comprises at least one of a clear coat or epoxy. In another example the secondary ink is applied for data addition wherein the secondary ink provides unique information about the object or the object's contents. In another example the secondary ink is applied for decoration. In yet another example, a printing system applies the secondary ink on top of the varnish. In another example, the secondary ink is substantially suspended between the varnish layer and the final varnish layer to flex therewith as the object deforms.

Another embodiment may be a method for applying an ink to an object, the method including providing a raw material that has a varnish layer thereon, executing an enhancement to the varnish layer so the varnish receives an ink, applying a secondary ink to the varnish layer wherein the varnish layer is at least partially positioned between the secondary ink and the raw material, and applying a final varnish layer over the secondary ink wherein the secondary ink is positioned between the varnish layer and the final varnish layer.

In one example the varnish layer is cured before the secondary ink is applied. In another example the varnish layer, secondary ink, and final varnish layer adhere to the raw material to flex therewith. In yet another example, the final varnish is only substantially applied over the secondary ink and does not substantially contact the varnish layer. In one example the enhancement is applied by mechanical topography adjustment, flame, plasma, corona, or a chemical deposition, Yet another embodiment is a method for applying an ink to a varnished surface, where the method includes providing an object that has a varnish thereon; applying an enhancement to the varnish, the enhancement including applying tension to the object and varnish, exposing the varnish to several flame treatment systems that have a lean methane and oxygen mixture while the object is being stretched, applying a plasma treatment to the varnish of about 80% nitrogen and about 20% argon mixture, applying a chemical deposition to the varnish, decorating the enhanced varnish with an ink.

One example of this embodiment includes applying a post decoration varnish via digital application process and curing the decoration varnish with a UV LED light array at about 17 W/cm^2 over about 6 seconds.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
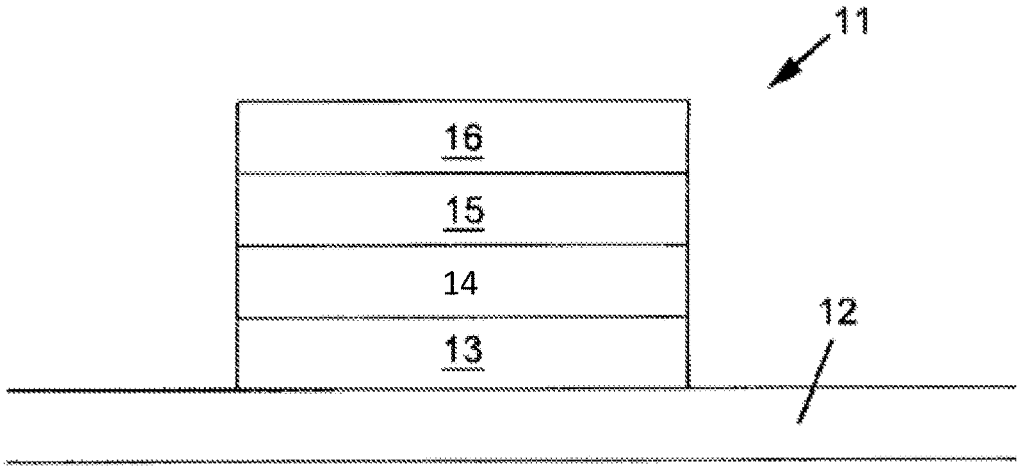
FIG. 1 is a schematic representation of a three dimensional object that has been decorated directly on the raw substrate and finished with an over varnish.
Figure 2:
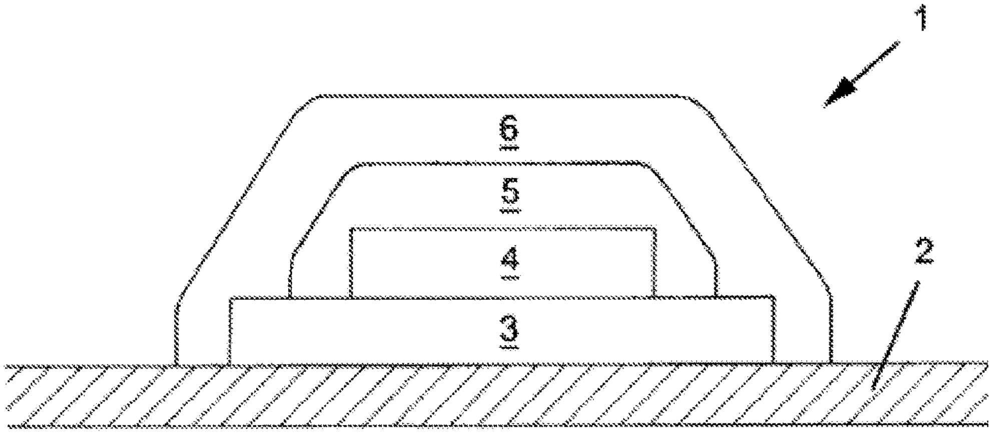
FIG. 2 is another schematic representation of a three dimensional object that has been decorated.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

The present disclosure relates generally to three dimensional objects such as a beverage can, bottle or other container. The object may be manufactured from one or more of the following raw materials or a hybrid thereof: aluminum, glass, plastic, fabric, cardboard, paper, wood, urethane, vinyl, or the like. The object may be designed to hold, preserve and protect a product in the form of liquids, solids, or gases. This method allows for delayed differentiation of the object after its creation without the need for any additional substrates. The process may be utilized for decoration, data addition, traceability, date/time stamp, among others benefits.

A three dimensional object that has been varnished may be augmented with decoration and data (hereinafter "D&D") at any time or location subsequent to its initial manufacturing process. The D&D may be directly applied to the original varnish and encapsulated by a top coat varnish. This disclosure enables mass customization, made to order, made to stock, lot size one, small batch, among other things.

Figure 3:
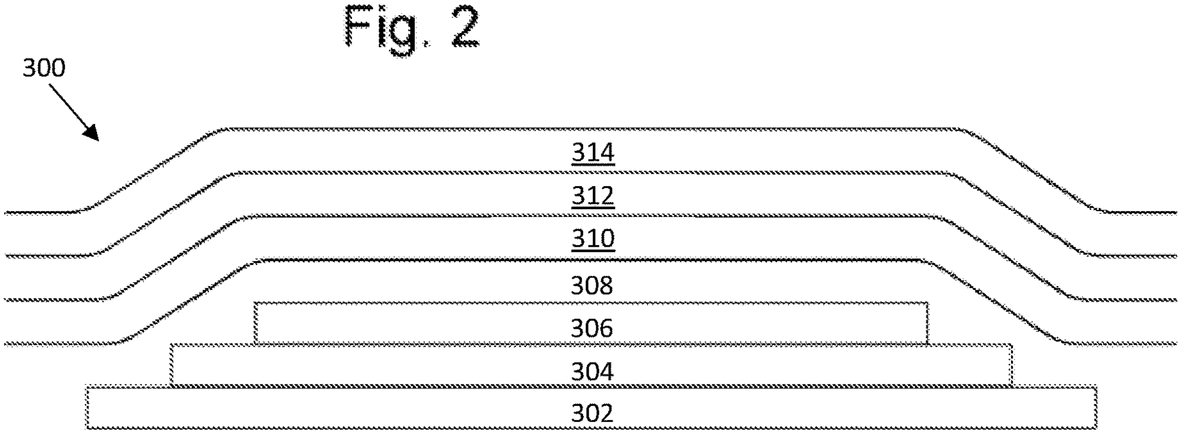
FIG. 3 is a schematic representation of a design and data addition on a three dimensional object that illustrates the additions placed above an original varnish layer and below a top coat varnish.

Referring now to FIG. 3, a process improvement that is applicable for any flat or three dimensional object that has been varnished (clear coat, epoxy, protective coating, etc.) is illustrated.

In one aspect of this disclosure, the three dimensional object 300 may be represented as an aluminum beverage can for descriptive purposes but is not be limited to this raw material or application. More specifically, the raw material 302 may be any raw material utilized for packaging. Accordingly, the aluminum beverage can is only a segment of the consumer packaged goods space and this disclosure is not limited to such an application. The teachings discussed herein may apply to any type of object that typically requires routine replacement or replenishment, such as food, beverages, clothing, smoking products, beauty products, and household products. The objects that may benefit from the teachings of this disclosure come in a variety of materials and shapes and the raw material 302 may be aluminum, glass, plastic (such as Polyethylene Terephthalate Glycol, Polycarbonate, Amorphous Polyethylene Terephthalate, Polyvinyl Chloride, Polystyrene, Polypropylene, and the like), fabric, cardboard (such as Solid Unbleached Sulfate, Solid Bleached Sulfate, Coded Recycle Board, and the like), paper, wood, urethane, vinyl, foil, metalized films, etc. The object 300 may be utilized in food, health, beauty, financial, entertainment, consumer electronics, cannabis, pharmaceutics, nutraceuticals, automotive, retail, and the like.

The term "varnish" as used herein, is intended to describe a protective coating. For the purpose of this document the original object or raw material 302 may have been coated with a varnish prior to utilizing this method. This coating is typically deposited to protect the raw material 302 from the elements and/or seal and protect a decoration layer 306. In one non-exclusive example, the varnish 308 may be a varnish manufactured by PPG, Valspar, Akzo Nobel or the like In the case of the aluminum beverage can, a primary varnish 308 may be placed over the raw material 302 (and over any primary ink 306 and treatment layer 304 there between). The primary varnish may be a highly cross linked thermal set system that may contain wax and silicon. The extremely demanding can manufacturing process today requires the primary varnish 308 to be applied and cured to complete the manufacturing process. If this primary varnish 308 were omitted the can would not be able to complete the necking process and would be unsuitable for the typical manufacturing process of the can. The primary varnish 308 is engineered to reduce the coefficient of friction for high speed packaging, create a water barrier for the original inkset 306 or raw material 302, create a vapor barrier, create surface that is abrasion resistant and wear resistant, increase color stability, and establish a desired finish (such as shine, sheen, matte, etc.), among other things.

The varnish 308 may be applied using various techniques known in the art. For example, the varnish may be applied using analog or digital printing processes such as Offset, Flexo., Gravure, and the like. Alternatively, the varnish may be applied utilizing an atomized process that is electrostatic, sprayed on, rolled on, ultrasonic, or any other known method for applying the varnish 308.

The varnish 308 is often intentionally engineered as a very low energy release agent in order to prevent damage in high speed manufacturing, shipping, and storage. The varnish 308 is also often designed to protect the base raw material 302 and/or primary decoration and ink and data 306 from the elements. In one aspect of this disclosure, the particular type of varnish 308 utilized on the object 300 is identified. The particular type of varnish 308 applied may be identified so the varnish properties are understood. The varnish 308 is often specifically designed to resist material adhering thereto. More specifically, the varnish 308 is typically applied to prevent debris from contaminating the surface, to protect the can from abrasion, provide water resistance, and to enhance the aesthetic or textural appeal of the package as discussed herein.

Due to the protective nature of the varnish 308 the majority of today's objects do not and/or cannot effectively be printed after the varnish 308 is applied to the surface without the use of a third-party substrate. These additional substrates may be labels, shrink sleeves, stickers, or anything that is not part of the base materials utilized in the initial fabrication of the object 300 itself.

One aspect of this disclosure will enable mass market customization or lot size one packaging without sacrificing graphic quality or applying another third-party substrate to the package as a medium (such as a sticker, label, shrink sleeve, or the like as discussed herein).

The term "delayed differentiation" discussed herein is defined as a generic package that is later improved into a specific product via decoration or data addition. While the initial package may retain its physical shape and materials, the contents, artwork/copy, and data requirements may differ significantly from one package to the next.

The term "data addition" can be defined as the addition of a stock-keeping unit ("SKU"), barcode, or other embedded data that may be read from the object 300 itself. This embedded process may occur via printing, marking, stamping, embossing, etc.

The term "mass customization" can be defined as any object that is made to order at or near the same cost as its mass production counterparts. In comparison to traditional manufacturing, this enables the total product ordered for manufacturing to be as small as one object 300, herein referred to as lot size one. Lot size one may also be defined as the ability of end user to select and customize printing on the object being ordered to individually meet their needs. Typical surface enhancement techniques may be implemented on the varnish 308 as needed as part of the enhancement 310. These options are well known to those skilled in the art and as such will not be discussed in great detail. Options for enhancement 310 may include mechanical topography adjustment, flame, plasma, corona, chemical deposition, and the like. In one aspect of this disclosure, the enhancement 310 may be performed via direct contact with the varnish 308 with an abrasive material such as an emery cloth, sand paper, metal pad, sand blast, dry ice blast, heat, open flame, or the like. More specifically, by modifying the localized topography of the coating mechanically it may increase the surface area exposure. Heat or open flame can often be used to change the varnish 308 in such a way that it prepares the varnish 308 for ink 312 adhesion by creating a microscopic marred topography that is cleaned from debris. Further, the enhancement 310 may change the surface energy of the varnish 308 allowing the ink 312 to adhere thereto.

Chemical enhancement 310 of the varnish 308 may be completed via spraying, wiping, or submersion of the object with surfactants, solvents, and deposition among other things. Surfactants may act as detergents, wetting agents, emulsifiers, foaming agents, and dispersants. More specifically, the surfactant may allow for the object to be cleaned of debris and lubricants used during the primary manufacturing process. This allows the enhancement 310 unobscured access to the varnish 308. Similarly, solvents may be used to dissolve, dilute, or remove other materials. Solvents often consist of liquid organic compounds. Solvents can include but are not limited to MEK, Tauline, Acetone, Butanone, Butanoyl, and the like. Solvents may be used on the enhancement layer 310 to decrease surface energy by eroding or etching away the primary manufacturing varnish, promoting ink 312 adhesion. The varnish may be degraded until the surface energy is compatible with the ink set 312.

Chemical enhancement can also be achieved through a deposition process (direct or vapor). This can be done via brushing, spraying, dispensing or dip coating. Several examples of this include conformal coating, pyrosil, plasma, hot wall, cold wall, photo initiated, laser/chemical, and other CVD technologies. Deposition allows the primary manufacturing varnish 308 to remain intact by creating a chemical middle layer between the varnish and the inkset 312. This process can alter the surface energy of the varnish 308 while simultaneously promoting a chemical bond with the inkset 312 chosen.

The enhancement layer 312 may also undergo accelerated environmental decay to change the properties of the varnish 308. One non-exclusive example is often referred to as tropical decay. More specifically, some varnish types will decay in a tropical environment over time. These varnish types may be exposed to an artificially created environment to expedite the manipulation of the varnish layer 308 via temperature, humidity and pressure control over specific time cycles.

While specific examples for enhancement 310 are discussed herein, any combination of these methods may be used in any number of intervals. More specifically, in one aspect of this disclosure a combination of the enhancement layer 310 options discussed herein are applied to the varnish 308 prior to application of the ink 312. Further still, in other embodiments, a single enhancement 310 option may be applied to the varnish layer 308 several times prior to applying the ink layer 312. Accordingly, any number of enhancement layer 310 options may be applied to the varnish 308 prior to applying the ink layer 312.

Decoration and data addition may then be achieved on top of the enhanced varnish via a printing system. The printing system may be a digital or analogue process.

A "digital printing process" can be defined as anything that does not require the use of fabricating equipment specifically for the addition of decoration or data. In most uses it will be in the form of inkjet, electrostatic, laser printing, and the like that deposit inks or toner directly onto the varnish of the three dimensional object 300. The decoration medium may be cured via ultraviolet, heat, infrared, and the like as is known in the art. Selection will be based on the specific requirements of the three dimensional object.

An "analogue printing process" may be any decoration process that actually requires manufacturing of a physical object to create the decoration or data transfer. This may come in the form of plates or stamps and typically comes in direct contact with the three dimensional object. Currently available options for the purpose of description include offset, gravure, flexography, and the like.

The term "data addition" may be defined as adding information to the object after the objects manufacturing process. The data set may consist of part number, serial number, code date, lot information, Global Trade Item Number (hereinafter "GTIN"), SKU, or any other data. It may be in the form of a 1 d, 2d barcode, digital identifier, alphanumeric, variable data, etc.

Upon completion of decoration and data addition, another final varnish 314 will be applied to properly protect the ink set 312 and ensure the safety of the end user. This varnish 314 will be selected to meet the requirements of the end user and may be applied in a digital or analogue process. The post decoration or top coat varnish 314 may be applied in a flood coat across the entire object or specifically placed only in the regions required that were differentiated with decoration and/or data. Depending on the objects lifecycle, the top coat varnish 314 may be cured via ultraviolet, infrared, time, temperature, etc.

The final varnish 314 may be applied via digital or analogue methods. The digital process may consist of inkjet printheads, ultrasonic, etc. The inkjet application may work much as it is described in the decoration section. It may blanket or specifically locate the overcoat varnish 314 on the object 300. In order to minimize the use of volatile organic compounds (hereinafter "VOCs"), the use of an ultraviolet curable coating may prove to be the most environmentally effective. If a more traditional thermal setting varnish is required to meet the demanding objects needs, one or multiple printheads, ultrasonics, or other digital device may be utilized to apply the coating 314.

Varnish application via analogue process may also selected as the most effective technique. A mandrel based physical transfer like those listed above for decoration are options for application of the varnish 314 as well. This may also include pneumatic spray, airless spray, atomizers, or the like for a no touch varnish blanket.

One aspect of this disclosure allows for delayed artwork and data addition to any three dimensional object 300. Further, the process may occur at any point after the object 300 is manufactured to be in proper form for the product being placed therein. During the initial manufacturing of the object 300, the object 300 may or may not be decorated, with or without data embedded. However, regardless of the type of decoration (or whether any decoration is applied at all), the varnish 308 is applied and cured.

Example 1: Aluminum Can

Figure 4A:
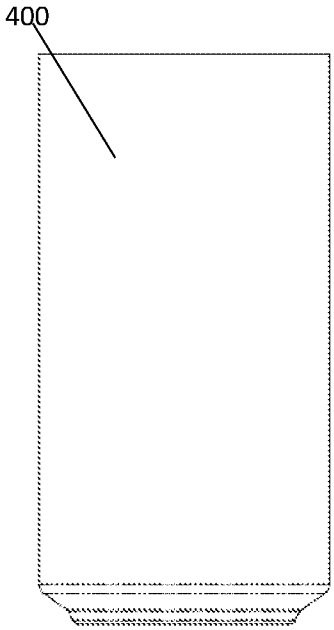
FIG. 4*a* is a side view of a can before a necking process.
Figure 4B:
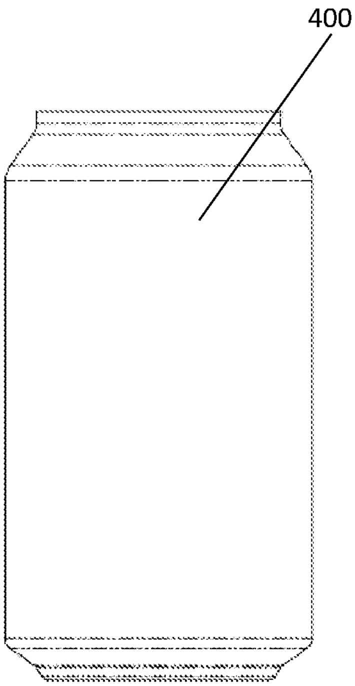
FIG. 4*b* is a side view of the can of FIG. 4*a* after a necking process.

Referring now to FIGS. 4*a* and 4*b*, one non-limiting example of an aluminum can 400 is illustrated. In FIG. 4*a* the aluminum can 400 is in the cupped, drawn, trimmed, decorated (optional), and varnished state. In FIG. 4*b* the aluminum can 400 is in the final necked condition ready for filling and sealing of the lid.

In the non-exclusive example of the aluminum can of FIGS. 4*a* and 4*b*, the aluminum can 400 is a three dimensional object that is produced over 200 billion times annually. A typical aluminum can 400 has a mass production history dedicated to minimum order quantities of about 220,000 cans. These cans 400 are typically decorated at the original manufacturing facility. The high speed, historically analogue process operates with very limited flexibility.

Regardless of decoration, even if the can is left undecorated, the can 400 must be coated with a protective layer inside and out. The inside protective layer is specifically designed to prohibit the aluminum can from interacting with the filled product. There is often a great deal of regulation and quality control associated with this protective coating as it comes in direct contact with the beverage itself. As such, a great deal of precaution to not negatively affect this coating or allow any new materials/debris to enter the aluminum can prior to filling and sealing must be taken.

The outside protective varnish layer 308 is typically a highly cross linked single part thermal setting varnish system. This varnish 308 is specifically designed to assist in the manufacturing of the aluminum can 400 through manufacturing equipment at both initial fabrication and later high speed material handling. The varnish 308 must enable high speed necking of the part along with assist filling equipment and seaming equipment later in the manufacturing process. Without this varnish 308, the material cannot be run at the desired quality and manufacturing rates. The varnish 308 has a low coefficient of friction or release agent preventing the can 400 from collecting debris in the filling, sealing, and logistics phases of its lifecycle. The varnish 308 may also act as a wax or silicon like material having a very low surface energy, drastically limiting delayed differentiation options.

Decorating the aluminum can 400 prior to applying the varnish 308 is typical and protects the inks 306 from moisture, light, and the elements. The aluminum barrier 302 of the can 400 does not allow for material migration through the metal itself, and as such multiple protective coatings are available. There are a few major varnish manufacturers in use today in the can manufacturing industry as discussed herein. Each manufacturer makes several different varnishes based on user requirements and price points.

Undecorated but varnished cans are often produced in the same large order quantities for future decoration or data enhancement. Prior to this process, the enhancement option of an already necked can was typically limited to a shrink sleeve or label option. These options leave much to be desired based on aesthetics and tactile interaction.

Due to the volume and cost requirements of the typical can manufacturing process, it is currently difficult for users to obtain a high quality, low volume delayed decoration option for the can 400. Many of these end users require far less than the available minimum order quantities to allow for decoration at the initial supplier. Some suppliers of the beverage can industry include Ball, Crown, Rexam, Corvasis, among others. If the end user does not opt for a high volume of decorated cans, another option from the supplier is an undecorated part with a varnish layer 308. The varnish 308 maintains an unoxidized aluminum surface often referred to as a "bright can."

The bright can is shipped from the initial manufacturer after being cupped, drawn, trimmed, varnished, cured, and necked, and may be cleaned with deionized water solution or run through a heated surfactant bath. This process lowers the surface tension of the can 400, allowing for the removal of any secondary debris or chemicals that may be left on the aluminum can from fabrication and/or shipping. Due to the fact that the varnish 308 is highly cross linked, it likely requires surface energy manipulation, or enhancement 310, prior to accepting an ink layer 312 thereon. There are several enhancement techniques available as discussed herein with known heuristics to those skilled in the art.

The can is then decorated and/or enhanced with data 312 on top of the initial varnish system 308 via a digital inkjet system. These inkjet systems are well understood by those in the art so we will only briefly define them here. Through the use of a single or plurality of print heads, a W, C, M, Y, K and/or spot colors, decoration and/or data is applied to the varnished and necked can. These inksets may be specifically formulated to work with the aforementioned varnish manipulation techniques, allowing for proper visual and adhesion properties to the surface. The inkset would also be selected to withstand stress and strain, abrasion prone, low temperature, and high moisture environments of this thin walled three dimensional object or can 400.

A post decoration varnish 314 may then be applied to the can to encapsulate the inkset between two highly cross linked varnish materials 308, 314, thus protecting both the inkset from the elements and the end consumer from particle migration. Further still, sandwiching the decoration 312 between the primary varnish 308 and the final varnish 314 may allow the decoration 312 to be suspended therebetween. In this configuration the decoration 312 may deform with the object as the primary varnish 306 and final varnish 314 flex therewith. This final varnish coat 314 may be applied via a roll coat analog process. The varnish 314 will cure via baking in an oven at an elevated temperature specified by the manufacturer.

Example 2: Metalized Pouch

A form-filled flexible metalized pouch is a flexible three dimensional object that is currently limited by technology in the delayed differentiation manufacturing process. As a single use product, this typically takes the form of a sachet, being manufactured as a three piece laminate. This three piece laminate consists of an internal sealant layer, a middle metalized barrier, and an external plastic layer.

The pouch is created by the primary manufacturer without decoration or varnish. The pouch's outer-most plastic layer is designed for a printing process. The outer-most plastic layer is then sent to an intermediary manufacturer often referred to as a "converter." The converter will decorate the outer-most plastic layer using analogue or digital methods and apply a varnish to protect the ink. Dependent of the final assembly, manufacturers may desire the outer-most plastic layer to remain undecorated and varnished only. The outer-most plastic layer is then rewound or converted into a pre-made sachet for use at the final assembly manufacturer. Typically the only decoration or data addition after this process is marking the manufacturing date onto the package via laser code date, thermal transfer, CIJ, with a focus on contrast using a dot matrix format.

In this example, the final assembly manufacturer is performing delayed product differentiation. The initial film will be produced by the primary supplier, generically decorated and varnished by a converter, and sent to the final assembly manufacturer as a wound film with an upper varnish 314 component.

In this example, enhancement 310 of the varnish may be performed as follows. More specifically, the film is unwound by going through a set of servo driven tensions, idlers, and or pulleys. Several flame treatment systems that have a lean methane and oxygen mixture are used to preheat and clean the varnish while creating micro-abrasions in the surface topography of the film. The repeated heating, cooling, and tension differences of this part of the manufacturing process allow for artificial decay and work hardening of the varnish 308. After the varnish 308 has been cleaned the film undergoes plasma treatment comprising of an about 80% nitrogen and about 20% argon mixture. The varnish may be between about 5.2 millimeters and about 11.7 millimeters from the tip of the combustion zone of the plasma treatment. This ensures proper D2F for proper plasma to varnish interface. This process may use chemical deposition through the use of oxidation while simultaneously creating a greater difference in the micro-abrasions from the initial flame treatment. The oxidation allows the high points in the micro-abraded surface to expand while simultaneously deepening the low points. This entire process raises the surface energy of the varnish 308 so that it is receptive to the inkset 312 for decoration.

The film may then be decorated and a 2D barcode may be added on top of the newly enhanced varnish via a digital inkjet system. Through the use of a plurality of digital print heads, a W, C, M, Y, K or spot color decoration will be applied to the film. These inksets may be selected to work with the aforementioned varnish 308 enhancement techniques, allowing for proper contact angle and adhesion to the surface. The inkset 306 is also specifically engineered to withstand stress and strain, low temperature, and high moisture environments. This may be controlled through a UV curing process, ensuring the complete encapsulation and curing of the inks.

A post decoration varnish 314 is then applied to the film to properly protect both the inkset 312 and the end user. This will be applied via digital application process or any other process known in the art. In one aspect of this disclosure, the post decoration varnish 314 is applied to adhere to the new ink 312 placed on the package along with the varnish 308 in any area that is not decorated. The varnish 314 will be cured by and UV LED light array at about 17 W/cm^2 over about 6 seconds. The package will then be properly qualified to ensure the inkset 312 is encapsulated between the varnish layers 308, 314 and does not allow for particle migration into the package contents.

Example 3: Pharmaceutical Packaging

The pharmaceutical industry requires a great deal of accuracy and traceability. As such, the ability to differentiate each individual product is imperative. This example includes an assembly of two separate three dimensional objects that are enabled by the delayed differentiation process discussed herein. The final assembly is specifically tailored to the needs of an individual patient.

In this example, fictional patient "John Doe" has been diagnosed with a heart condition and is being placed on several medications such as Beta Blockers, ACE Inhibitors, Digoxin, Hydralazine, and Nitrates. These medications are often administered individually or together with specific schedule and dosing requirements. To be safe and effective, they must be tailored to the patient's needs on an individual level.

In this non-exclusive example, a primary manufacturer creates a generic template based medical container. This container has 31 compartments corresponding to the possible days in a month. This container is then decorated with the pharmaceutical companies branding, a time stamp, and a mold number; signifying its creation date, production lot, and the company who will be filling it on the primary ink layer 306. It is then coated with a primary varnish 308 that is specifically designed to protect the identifying information. These thermoformed containers are nested, packaged and shipped to the final manufacturer.

After arriving at the final manufacturer, the thermoformed container is de-nested and cleaned. Continuing through the packaging line, the pre-applied varnish 308 may be exposed to an enhancement 310 as discussed herein and then will be printed upon with John Doe's specific patient information on the ink layer 312. This will include the date, serial number, and production code date specific to this individual container. A post decoration varnish 314 is then applied to the container to properly protect the printed information and consumer. The post decoration varnish 314 may be applied via a digital application process. The container is filled with the exact prescriptions and dosage needed for each corresponding day of the month. It then travels through a quality control and validation process to ensure that the exact prescription and dosing requirements have been met. Each individual compartment of the container is then sealed closed with a child proof and tamper evident tear off for each day.

In parallel to the creation of the thermoform another cardboard flat is created at a different primary manufacturer. This cardboard flat is then printed with the pharmaceutical company's logo, generic warnings and initial data desired and/or required by law on the primary ink layer 306. The flat is then coated with a varnish 308 that is specifically designed to protect the identifying information. The cardboard flat is then formed, partially glued, and shipped to the final site in the shape of a flat folding premade container.

Once arriving at the final assembly manufacturer the flat folding premade container is erected into a cardboard box by a case former. The sealed thermoformed container is then inserted into the cardboard box. The cardboard box will be printed on the ink layer 312 with John Doe's address, shipping information, specific dosing instructions provided by his primary care provider and validated by an onsite pharmacist at the packaging facility. A data set will also be printed on the ink layer 312 in the form of a code date, serial number, and encrypted anti-counterfeit digital image. A post decoration varnish 314 is then applied to the cardboard package to properly protect the printed information from deterioration or degradation. Another tamper evident seal is applied to the cardboard container ensuring the package is sealed completely.

The package is then shipped to John Doe via a certified pharmaceutical delivery service. Once the package is received, John Doe is able to verify the correct prescriptions and dosing requirements by scanning the serial numbers or the printed anti-counterfeit image. This allows product transparency and traceability from the initial creation of the prescription through the entire manufacturing process and delivery to John Doe.

While an exemplary embodiment incorporating the principles of the present application has been disclosed hereinabove, the present application is not limited to the disclosed embodiments. Instead, this application is intended to cover any variations, uses, or adaptations of the application using its general principles. Further, this application is intended to cover such departures from the present disclosure as come within known or customary practice in the art to which this present application pertains and which fall within the limits of the appended claims.

The invention claimed is:

1. A method for applying an ink to an object, comprising:

providing a raw material that has a varnish layer thereon, the varnish layer being applied to the raw material as a liquid;

executing an enhancement to the varnish layer so the varnish receives an ink, the enhancement modifying the surface energy of the varnish by one or more of modifying a localized topography on the varnish layer or creating a microscopic marred topography on the varnish layer; and applying a secondary ink to the varnish layer wherein the varnish layer is at least partially positioned between the secondary ink and the raw material;

wherein the raw material is a can and the secondary ink is applied after a necking process.

2. The method of claim 1, further comprising applying a final varnish layer over the secondary ink wherein the secondary ink is positioned between the varnish layer and the final varnish layer.

3. The method of claim 1, wherein the object has a primary ink layer between the raw material and the varnish layer.

4. The method of claim 3, wherein the object has a treatment layer between the raw material and the primary ink.

5. The method of claim 1, wherein the varnish layer and the secondary ink are not applied in the same manufacturing facility.

6. The method of claim 1, wherein the object has a primary ink layer between the raw material and the varnish layer and a final varnish layer over the secondary ink wherein the secondary ink is layered between the varnish layer and the final varnish layer.

7. The method of claim 2, wherein the object has an outer surface and the secondary ink does not cover the entire outer surface and the final varnish only covers the portions of the outer surface that have secondary ink thereon.

8. The method of claim 1, wherein the varnish layer comprises at least one of a clear coat or epoxy.

9. The method of claim 1, wherein the secondary ink is applied for data addition wherein the secondary ink provides unique information about the object or the object's contents.

10. The method of claim 1, wherein the secondary ink is applied for decoration.

11. The method of claim 1, wherein a printing system applies the secondary ink on top of the varnish.

12. The method of claim 2, wherein the secondary ink is substantially suspended between the varnish layer and the final varnish layer to flex therewith as the object deforms.

13. A method for applying an ink to an object, comprising:

providing a raw material that has a varnish layer that was applied thereon as a liquid;

executing an enhancement to the varnish layer so the varnish receives an ink, the enhancement degrading the varnish layer by one or more of modifying a localized topography on the varnish layer or creating a microscopic marred topography on the varnish layer;

applying a secondary ink to the varnish layer wherein the varnish layer is at least partially positioned between the secondary ink and the raw material; and applying a final varnish layer over the secondary ink wherein the secondary ink is positioned between the varnish layer and the final varnish layer;

wherein the raw material is a can and the secondary ink is applied after a necking process.

14. The method of claim 13, wherein the varnish layer is cured before the secondary ink is applied.

15. The method of claim 13, wherein the varnish layer, secondary ink, and final varnish layer adhere to the raw material to flex therewith.

16. The method of claim 13, wherein the final varnish is only substantially applied over the secondary ink and does not substantially contact the varnish layer.

17. The method of claim 13, wherein the enhancement is applied by mechanical topography adjustment, flame, plasma, corona, or a chemical deposition.

18. A method for applying an ink to a varnished surface, comprising:

providing an object that has a varnish thereon;

applying an enhancement to the varnish, the enhancement comprising:

applying tension to the object and varnish;

exposing the varnish to several flame treatment systems that have a lean methane and oxygen mixture while the object is being stretched;

applying a plasma treatment to the varnish of about 80% nitrogen and about 20% argon mixture;

applying a chemical deposition to the varnish;

decorating the enhanced varnish with an ink.

19. The method of claim 18, further comprising applying a post decoration varnish via digital application process and curing the decoration varnish with a UV LED light array at about 17 W/cm^2 over about 6 seconds.

* * * * *